United States Patent [19]
Luz

[11] 3,938,004
[45] Feb. 10, 1976

[54] DEFLECTION SYSTEM
[75] Inventor: David Warren Luz, Indianapolis, Ind.
[73] Assignee: RCA Corporation, New York, N.Y.
[22] Filed: Feb. 27, 1974
[21] Appl. No.: 446,458

[52] U.S. Cl. ............... 315/411; 315/406; 315/408; 315/409; 178/DIG. 11
[51] Int. Cl.² ........................................ H01J 29/70
[58] Field of Search .......... 315/391, 395, 399, 406, 315/408, 409, 410, 411; 178/DIG. 11

[56] References Cited
UNITED STATES PATENTS
3,217,101  11/1965  Mattingly .................... 178/DIG. 11

Primary Examiner—T. H. Tubbesing
Assistant Examiner—T. M. Blum
Attorney, Agent, or Firm—Eugene M. Whitacre; Paul J. Rasmussen

[57] ABSTRACT

A horizontal deflection system is operable either from rectified and filtered alternating current line voltage or from a substantially lower voltage direct current voltage source. The need for a step-down transformer in the receiver power supply is eliminated by utilizing the horizontal output transformer to drop the rectified and filtered alternating current voltage when the receiver is operated in the alternating current line mode. The horizontal output transformer is utilized as a step-up inverter when the receiver is operated from the low voltage direct current source to produce a direct current voltage at a point on the horizontal output transformer substantially equal to the rectified and filtered alternating current line voltage.

10 Claims, 8 Drawing Figures

DEFLECTION SYSTEM

BACKGROUND OF THE INVENTION

This invention relates to deflection systems operable either from alternating current line voltage or from storage batteries.

A portable television receiver capable of being operated from an alternating current line voltage supply or alternatively from a battery supply typically develops direct current operating voltage by rectifying a relatively low voltage obtained from a step-down transformer. When the receiver is operated in the line voltage mode, the transformed alternating current line voltage may be rectified and filtered to develop direct current operating voltage substantially equal to the battery voltage. This direct current operating voltage usually is supplied through a winding of the horizontal output transformer to the horizontal deflection output stage which typically includes a power transistor. Current flow induced in a primary winding of the horizontal output transformer as the horizontal deflection system operates from this potential supply may then be used to induce voltage variations in other windings of the horizontal output transformer. The induced voltage variations may be rectified and filtered to supply additional direct current potentials to other receiver circuits.

When the receiver is operated in the battery mode, substantially the same direct current operating voltage is supplied to the same point on the horizontal output transformer from the battery and current flow induced in the horizontal output transformer primary winding by the action of the horizontal deflection system produces similar voltage variations which are rectified and filtered to create direct current voltage supplies at other potentials necessary for the operation of other receiver circuits.

Use of such a system requires that an expensive bulky step-down transformer be used to reduce the alternating current line voltage supply to the battery supply voltage. Attempts have been made to drop the voltage directly from rectified alternating current line potential to battery potential which may be supplied directly to the horizontal output transformer. Schemes involving this approach have met with little success, however, since the rectified alternating current line voltage must be dropped considerably in potential to approximate the voltage available from battery supplies commonly used with batteryor line-operated portable television receivers. Such a voltage dropping technique results in substantial power losses due to the flow of current through resistive elements.

SUMMARY OF THE INVENTION

In accordance with the invention, a deflection system selectively operable either from a first rectified and filtered alternating current line voltage supply or from a second substantially lower voltage direct current voltage supply includes a deflection winding, a deflection current generator, switching means and a transformer having at least a first winding. The deflection current generator is coupled to the deflection winding for generating therein deflection current having trace and retrace intervals. The first winding of the transformer is coupled to the deflection current generator and to the first and second voltage supplies, the first and second supplies being coupled to the transformer at first and second points respectively for having excited at the first and second points respectively voltages substantially equal to the first supply voltage and to said second supply voltage during the trace interval, the second supply being coupled to the second points through the switching means which has a first state for coupling the second supply to the second point during at least a portion of the trace interval and a second state for decoupling the second supply from the second point during at least a portion of the retrace interval.

The invention may best be understood by referring to the following description and accompanying drawings of which:

FIG. 1 is a schematic diagram of a deflection system embodying the invention; and FIGS. 2a–2g illustrate waveforms obtained at various points in the diagram of FIG. 1.

DESCRIPTION OF THE PREFERRED EMBODIMENT

Figure 1:
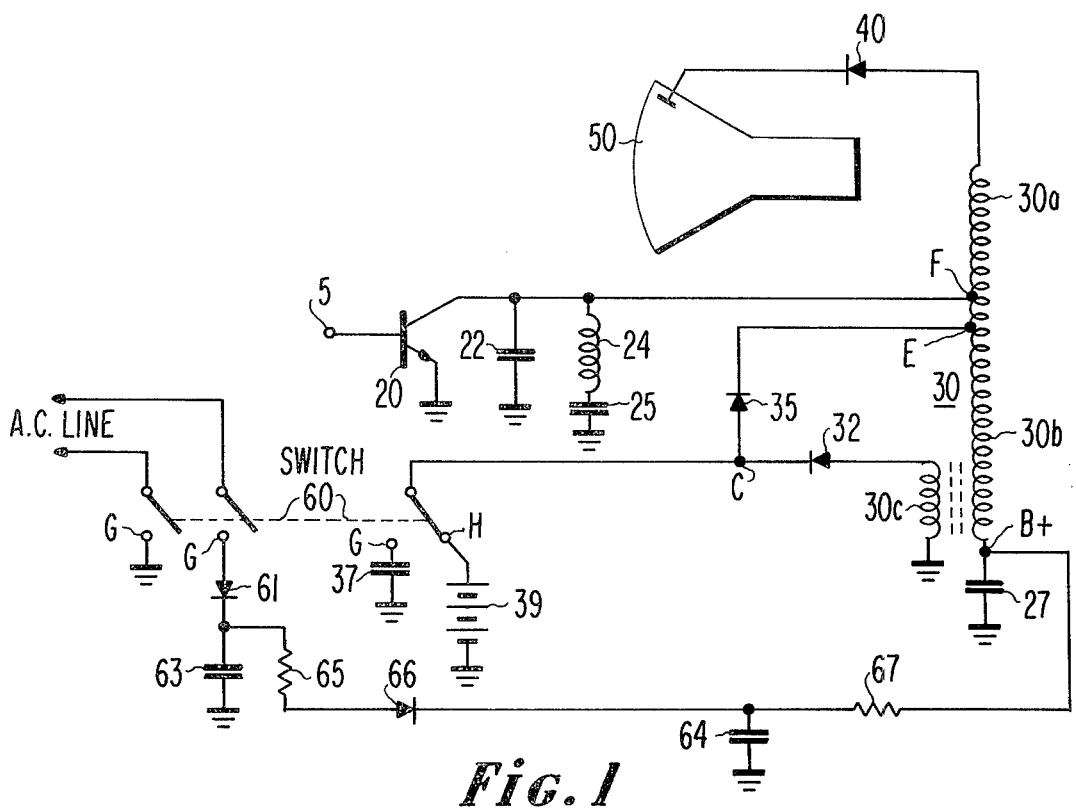
Figure 2A:

In a preferred embodiment of the invention illustrated in FIG. 1, a horizontal deflection rate signal 10 of FIG. 2a is coupled to a base electrode 5 of a horizontal deflection output transistor 20. The emitter of transistor 20 is grounded and its collector is coupled to a terminal of a retrace capacitor 22, to a terminal of a horizontal deflection winding 24 and to a tap F of a winding 30b of a horizontal output transformer 30. The remaining terminal of retrace capacitor 22 is coupled to ground and the remaining terminal of deflection winding 24 is coupled to a terminal of a S-shaping capacitor 25 the remaining terminal of which is coupled to ground.

The remaining terminal of winding 30b is coupled to a terminal of a storage capacitor 27, the remaining terminal of which is coupled to ground. The junction of winding 30b and capacitor 27 is coupled to the cathode of a blocking diode 66 through a current limiting resistor 67. The cathode of diode 66 is also coupled to a terminal of a filtering and storage capacitor 64, the remaining terminal of which is coupled to ground. The anode of diode 67 is coupled to one terminal of a smoothing resistor 65.

The remaining terminal of resistor 65 is coupled to a terminal of a storage capacitor 63 and to the cathode of a rectifier diode 61. The remaining terminal of capacitor 63 is coupled to ground. The anode of rectifying diode 61 is coupled to one terminal of a switch 60, another terminal of which is coupled to ground.

A high voltage winding 30a of horizontal output transformer 30 is coupled at one terminal to terminal F. The remaining terminal of high voltage winding 30a is coupled to the anode of a high voltage rectifier diode 40. The cathode of high voltage rectifier 40 is coupled to a kinescope 50.

A winding 30c of horizontal output transformer 30 has one of its terminals coupled to the anode of a rectifier diode 32. The remaining terminal of winding 30c is coupled to ground. Terminal C, the cathode of diode 32, is coupled to another terminal of switch 60. A storage capacitor 37 is coupled between another terminal of switch 60 and ground. Another terminal of switch 60 is coupled to the positive terminal of a battery 39, the negative terminal of which is coupled to ground. Terminal C is also coupled to the anode of a damper diode 35 the cathode of which is coupled at point E to a tap on winding 30b.

Referring to FIG. 1, operation of the horizontal deflection system for alternating current line voltage occurs when switch 60 is in the G position. When the switch is in that position, point C is coupled across storage capacitor 37 to ground, one side of the alternating current line is coupled to ground and the other side of the alternating current line is coupled to the anode of rectifier diode 61. Half-wave rectified line potential is stored in capacitor 63. Direct current operating voltage is supplied through resistor 65 and the forward biased blocking diode 66 to a second filtering and storage capacitor 64. Capacitor 64 provides direct current operating voltage at substantially the rectified line potential through current limiting resistor 67 to the B+ terminal of storage capacitor 27. Additionally, capacitor 64 may be utilized for providing direct current operating voltage for other receiver circuits. Resistor 67 protects horizontal output transformer 30 against excessive current in the event of arcing from the anode of kinescope 50 to ground.

Figure 2B:

During the first portion of the horizontal deflection trace interval, horizontal deflection output transistor 20 is held in cutoff by the negative-going portion of voltage waveform 10 of FIG. 2a coupled to point 5, the base of transistor 20. Current flows from the rectified and filtered alternating current line voltage supply established across capacitor 27 through winding 30b of horizontal output transformer 30 and horizontal deflection winding 24 to charge S-shaping capacitor 25. An approximately linear decreasing current in a first direction through horizontal deflection winding 24 is as shown by waveform 11 of FIG. 2b, the current through winding 24, as capacitor 25 charges through the inductance of windings 30b and 24 from the substantially constant voltage supply at point B+. At approximately the middle of the horizontal deflection trace interval, transistor 20 is driven into saturation by the positive-going portion of waveform 10 of FIG. 2a, the voltage applied to the base of transistor 20. As transistor 20 begins to conduct through its collector-emitter path, the flow of current in deflection winding 24 reverses and begins to increase in a second direction in an approximately linear fashion as shown by waveform 11 of FIG. 2b as S-shaping capacitor 25 begins to discharge through winding 24 and the collector-emitter path of transistor 20.

S-shaping capacitor 25 continues to discharge in a substantially linear manner through deflection winding 24 until the end of the horizontal deflection trace interval when the negative-going portion of waveform 10 of FIG. 2a drives transistor 20 into cutoff. As current abruptly ceases flowing in transistor 20, the current through deflection winding 24 begins to decrease in the second direction toward zero as waveform 11 of FIG. 2b indicates. The rapid turning off of transistor 20 marks the beginning of the horizontal deflection retrace interval. As transistor 20 is turned off, the current which had previously flowed to ground through it begins to charge retrace capacitor 22 as energy is transferred to retrace capacitor 22 from the magnetic fields established in windings 30b and 24 by the trace interval currents flowing in windings 24 and 30b.

Figure 2C:

During the retrace interval the voltage at all points of windings 30a and 30b rises above the B+ supply voltage to which winding 30b is coupled at its junction with B+ supply capacitor 27. The voltage waveform at point E, which is clamped at the voltage at point C during the trace interval as shown by waveform 14 of FIG. 2e, rises during the retrace interval as point E is decoupled from point C by virtue of the now reverse biased diode 35. Point F similarly rises from its approximately zero trace interval voltage to a high positive value with respect to ground, as shown by waveform 12 of FIG. 2c, as the energy recovered from windings 30a and 30b is now transferred to retrace capacitor 22. The voltage at the junction of high voltage winding 30a and high voltage rectifier 40 also rises to a peak positive value with respect to ground as shown by waveform 16 of FIG. 2f, and is rectified in rectifier 40 to supply high voltage to kinescope 50.

Retrace capacitor 22 then begins to discharge, transferring energy back into horizontal deflection winding 24 and horizontal output transformer 30, re-establishing magnetic fields therein. As retrace capacitor 22 discharges completely ending a first half-cycle of oscillation with the inductance of winding 24 and horizontal output transformer 30, damper diode 35 becomes forward biased again by virtue of the approximately zero voltage with respect to ground at point F illustrated in waveform 12 of FIG. 2c, and begins to conduct current from auxiliary supply capacitor 37 to which its anode is coupled. At this time the next succeeding horizontal deflection trace interval begins.

Figure 2D:

The voltage waveforms induced across winding 30b cause voltage waveform 13 of FIG. 2d to appear across winding 30c. Diode 32 is the rectifier which provides the trace interval rectified voltage of the positive-going portion of waveform 13 of FIG. 2d at point C. Winding 30c is selected to provide a rectified voltage at point C which is substantially equal to the supply voltage of battery 39. The rectified voltage is stored in storage capacitor 37 which is used to provide direct current voltage to other television receiver circuits and to provide damper current through diode 35 to damp the horizontal deflection retrace interval.

Figure 2E:
Figure 2F:

Thus it may be seen that when the deflection system of FIG. 1 is operated in the alternating current line voltage mode, direct operating current for the deflection system is provided through winding 30b from direct current voltage supply point B+ to point F, the junction of winding 30b and high voltage winding 30a. The voltage at point E, waveform 14 of FIG. 2e, is typically on the order of twelve volts during the trace interval when the voltage at point B+ is on the order of 100 volts by virtue of this direct operating current. Similarly the voltage at point F, waveform 12 of FIG. 2c, will be approximately zero volts during the trace interval. It is, of course, important that these trace interval voltages also appear at their respective points on transformer winding 30b when the deflection system is operated in the battery supply mode in order that the receiver performance be the same in the battery supply mode as it is in the alternating current line mode.

Figure 2G:

Accordingly, when the deflection system of FIG. 1 is disconnected from the alternating current line voltage supply by placing switch 60 in position H, capacitor 37 is disconnected and direct current operating potential is supplied to the horizontal deflection system from the low direct current voltage supply, battery 39. Direct current operating potential is supplied to the deflection system through deflection damper diode 35 and point E of horizontal output transformer winding 30b. The current supplied to the deflection system through damper diode 35 when the receiver is the battery operated mode, position H of switch 60, is illustrated by waveform 18 of FIG. 2g. It may be seen that current is supplied to the horizontal deflection system through damper diode 35 substantially throughout the horizontal deflection trace interval when the system is operating in the battery mode.

It is important to note that the battery supply 39 maintains the same trace interval voltage at point E as was provided at that point when the system was operating in the alternating current line mode. That trace interval voltage is again illustrated in waveform 14 of FIG. 2e. Similarly, the same trace interval voltage of approximately zero volts is established at point F as shown by waveform 12 of FIG. 2c. Consequently, the voltages at points E and F are substantially the same whether the receiver is operated in the line voltage mode or in the battery supply mode. However, in order to insure substantially the same performance in both the alternating current line voltage mode and the battery supply mode, a direct current voltage substantially equal to the rectified and filtered alternating current line voltage must be developed across B+ supply capacitor 27.

To accomplish this result the turns ratio of that portion of winding 30b between points E and F to that portion of winding 30b between points F and B+ is chosen substantially equal to the ratio of the voltage supplied by battery 39 to the B+ supply voltage across capacitor 27 when the receiver is operated in the alternating current line mode. By so choosing this turns ratio, as horizontal output transformer 30 is excited by current flow from terminal E to terminal F during the horizontal deflection trace interval, the voltage variations appearing between points E and F are transformed to substantially the amplitude of the direct current voltage which appears across B+ supply capacitor 27 when the receiver is operating from rectified alternating current line voltage.

In the battery operated mode the portion of horizontal output transformer winding 30b between points E and F is driven by current flow from point E to point F during the trace interval as illustrated by waveform 18, the current flow through damper diode 35 in the battery operated mode. The voltage appearing across supply capacitor 27 is stored therein to make capacitor 27 a substantially constant direct current voltage source. Current flow from point F to point E during the retrace interval is inhibited by the blocking action of damper diode 35. Thus there is no transformer action tending to discharge capacitor 27. Winding 30b and elements 35, 27 and 20 thus function as a step-up inverter, converting a substantially direct current illustrated by waveform 18, the current flow in damper diode 35, at a first voltage, the voltage provided by battery 39 when switch 60 is in the H position, into a source of higher direct current voltage, the substantially constant B+ voltage which appears across storage capacitor 27. Thus, whether the receiver is operating from rectified and filtered alternating current line voltage established across capacitor 27 or is operating from the lower voltage battery supply 39, the voltage at point B+ will be approximately the same.

It may be seen that the trace interval voltages at all points on winding 30b when the deflection system is operated in the battery supply mode are substantially the same as they are when the deflection system is operating in the alternating current line voltage supply mode. Differences in performance of the deflection system in the two modes are thereby eliminated. The B+ direct current voltage induced across capacitor 27 may be supplied to other receiver circuits whether the receiver is operating from the low direct current voltage supply, battery 39, or from the rectified and filtered alternating current line voltage supplied through elements 61, 63, 64, 65, 66, 67 and 27.

What is claimed is:

1. A deflection system selectively operable either from a first rectified and filtered alternating current line voltage supply or from a second substantially lower voltage direct current voltage supply, comprising:
 a deflection winding;
 a deflection current generator coupled to said deflection winding for generating in said deflection winding deflection current having trace and retrace intervals;
 switching means; and
 a transformer having at least a first winding coupled to said deflection current generator and to said first and second voltage supplies, said first and second supplies being coupled to said transformer at first and second points respectively for having excited at said first and second points respectively voltages substantially equal to said first supply voltage and to said second supply voltage during said trace interval, said second supply being coupled to said second point through said switching means having a first state for coupling said second supply to said second point during at least a portion of said trace interval and having a second state for decoupling said second supply from said second point during at least a portion of said retrace interval.

2. A deflection system according to claim 1 wherein said switching means comprises unidirectional current conducting means for decoupling said second points from said second supply during at least a portion of said retrace interval for allowing said voltage at said second point to vary substantially from said second supply voltage during said portion of said retrace interval.

3. A deflection system according to claim 1 wherein:
 said transformer further comprises a second winding for having induced therein voltage variations in response to current flow in said first winding;
 rectifying, filtering and storage means are coupled to said second winding for rectifying said voltage variations and for filtering and storing said rectified voltage for producing a direct current operating voltage substantially equal to said second supply voltage for supplying said second voltage to other receiver circuits when said deflection system is operated from said first voltage supply; and
 capacitance means coupled between said first point on said first winding and a source of reference potential for storing said first voltage generated at said first point during said trace interval and for supplying said first voltage to other receiver circuits when said deflection system is operated from said second voltage supply.

4. A deflection system according to claim 3 wherein said unidirectional current conducting means comprises a damper diode the anode of which is coupled to said rectifying, filtering and storage means when said receiver is operable from said first supply and to said second supply when said receiver is operable therefrom and the cathode of which is coupled to said second point on said first winding for damping said retrace interval portion of said deflection cycle.

5. A deflection system according to claim 1 wherein:

a third voltage is established at said deflection current generator coupling to said first winding during at least a portion of said trace interval; and said first and second supplies are coupled to said first winding such that the ratio of the number of turns of said first winding between said deflection generator coupling to said first winding and said second point to the number of turns of said first winding between said deflection generator coupling and said first point is substantially equal to the ratio of the difference between said second supply voltage and said third voltage to the difference between said first supply voltage and said third voltage.

6. A deflection system selectively operable either from a first rectified and filtered alternating current line voltage supply or from a second substantially lower voltage direct current voltage supply, comprising:
a deflection winding;
deflection current switching means coupled to said deflection winding and having a terminal adapted for being coupled to a source of synchronizing signals for being synchronized by signals coupled therefrom for generating recurring deflection current cycles having trace and retrace intervals in said deflection winding; and
a first winding coupled to said deflection current switching means, to said first supply and to said second supply, said first and second supplies being coupled to first and second points respectively of said first winding for having excited at said first and second points respectively voltages substantially equal to said first supply voltage and to said second supply voltage during said trace interval, said second supply being coupled to said first winding through unidirectional current conducting means for decoupling said second point from said second supply during at least a portion of said retrace interval and for coupling said second point to said second supply during at least a portion of said trace interval when said deflection system is operable from said second supply.

7. A deflection system according to claim 6 wherein:
a second winding is coupled to said first winding for having induced therein voltage variations in response to current flow in said first winding; and
rectifying, filtering and storage means are coupled to said second winding for rectifying said voltage variations and for filtering and storing said rectified voltage for producing a direct current operating voltage substantially equal to said second supply voltage for supplying said second supply voltage to other receiver circuits when said deflection system is operated from said first supply.

8. A deflection system according to claim 7 wherein said unidirectional current conducting means comprises a diode the anode of which is coupled to said rectifying, filtering and storage means when said receiver is operable from said first supply and to said second supply when said receiver is operable therefrom and the cathode of which is coupled to said second point of said first winding.

9. A deflection system according to claim 6 wherein:
a third voltage is established at said deflection switching means coupling to said first winding during at least a portion of said trace interval; and
said first supply and said second supply are coupled to said first and second points respectively for having the ratio of the number of turns of said first winding between said deflection switching means coupling and said second point to the number of turns of said first winding between said deflection switching means coupling and said first point substantially equal to the ratio of the difference between said second supply voltage and said third voltage to the difference between said first supply voltage and said third voltage.

10. A deflection system selectively operable from a first rectified and filtered alternating current line voltage supply or from a second substantially lower voltage direct current supply, comprising:
deflection switching means adapted for being coupled to a source of deflection synchronizing signals for switching in response thereto;
first and second windings coupled to said deflection switching means, said first winding being coupled for having deflection currents comprising trace and retrace intervals induced therein in response to said switching and said second winding being coupled for having voltage variations induced thereacross in response to said switching and said flow of deflection current in said first winding, said first and second voltage supplies being selectively coupled to first and second points respectively of said second winding, said first and second points being chosen for inducing a direct current voltage substantially equal to said second voltage at said second point during said trace interval when said deflection system is operable from said first voltage supply and for inducing a direct current voltage substantially equal to said first voltage at said first point during said trace interval when said deflection system is operable from said second voltage supply; and
second switching means coupled to said second supply and to said second point for switching to provide a current path from said second supply to said second point during at least a portion of said trace interval.

* * * * *